May 15, 1962 H. L. BUXTON 3,034,486
PULSATING ROTARY ENGINE
Filed Nov. 25, 1960 3 Sheets-Sheet 1

INVENTOR.
HARRY L. BUXTON
BY
McMorrow, Berman & Davidson
ATTORNEYS

May 15, 1962 H. L. BUXTON 3,034,486
PULSATING ROTARY ENGINE
Filed Nov. 25, 1960 3 Sheets-Sheet 2
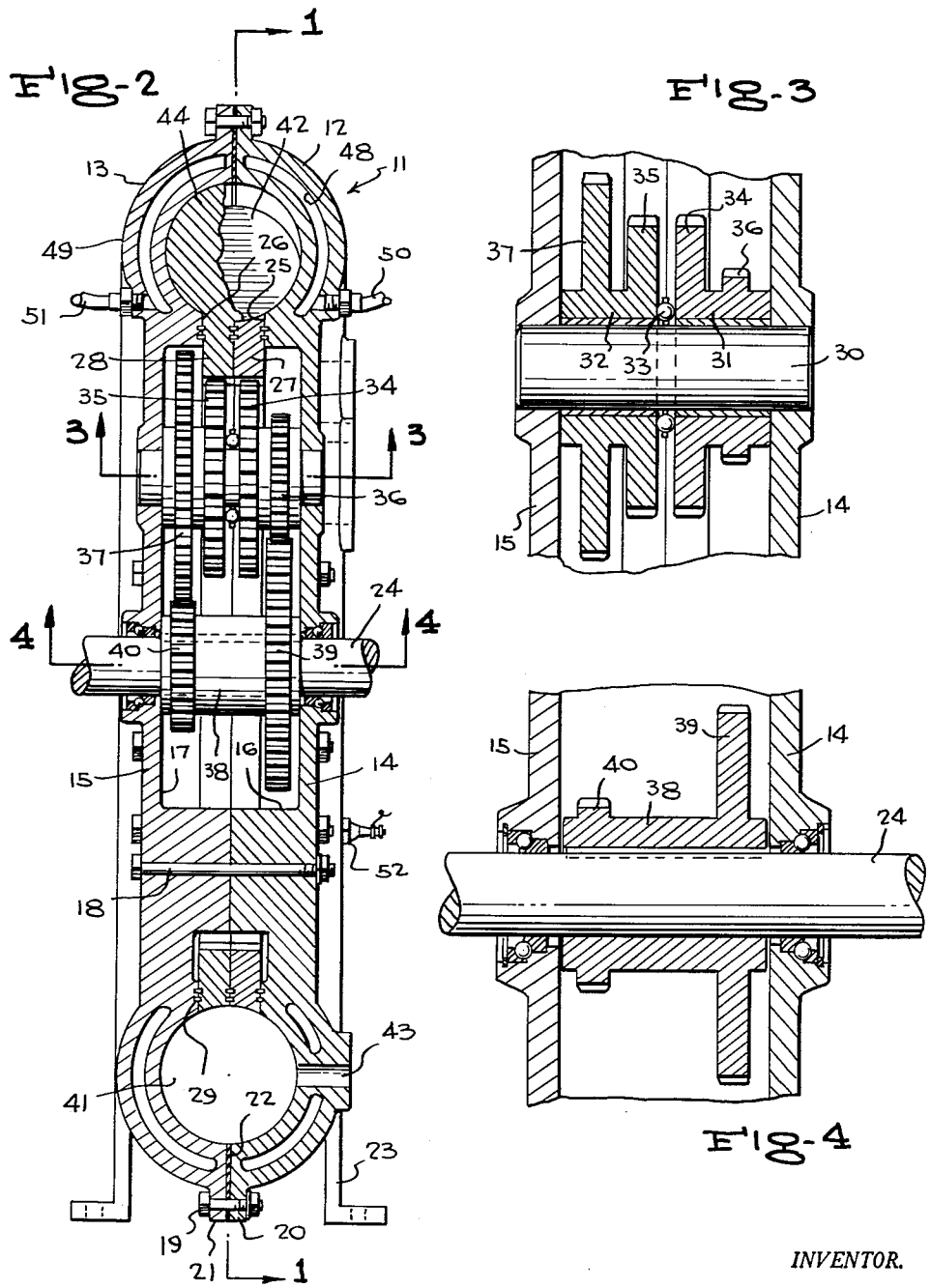
INVENTOR.
HARRY L. BUXTON
BY
McMorrow, Berman + Davidson
ATTORNEYS

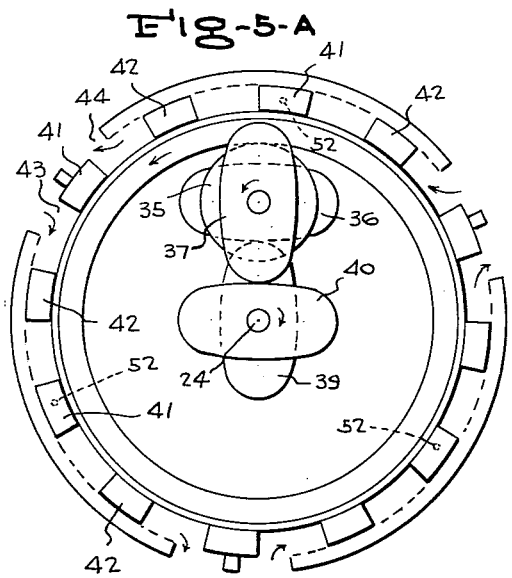
Fig-5-A
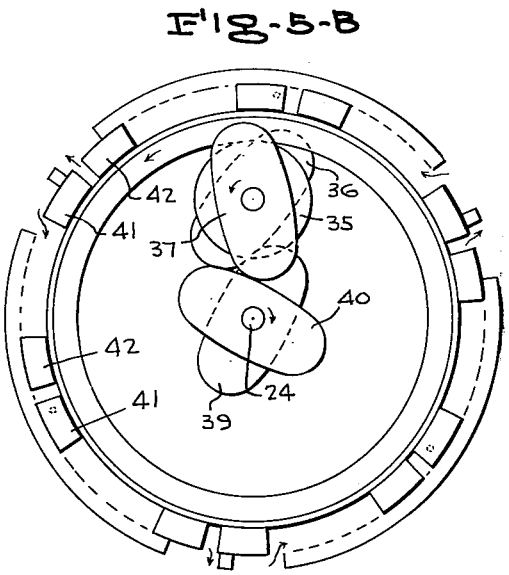
Fig-5-B
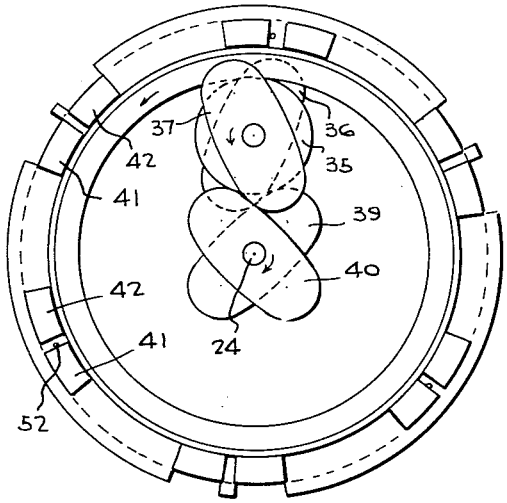
Fig-5-C
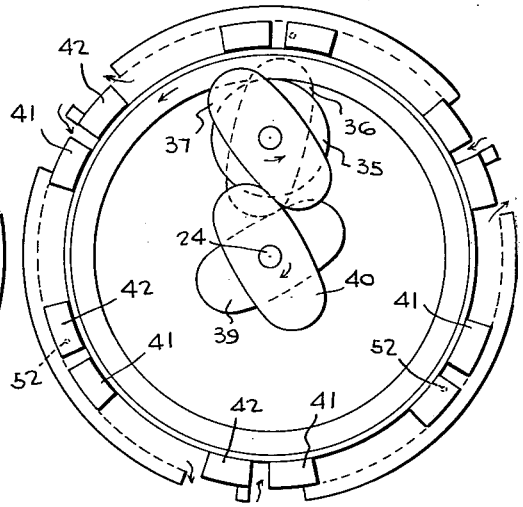
Fig-5-D
INVENTOR.
HARRY L. BUXTON
BY
McMorrow, Berman & Davidson
ATTORNEYS

3,034,486
PULSATING ROTARY ENGINE
Harry L. Buxton, Al-4385, Box 440, Anchorage, Alaska
Filed Nov. 25, 1960, Ser. No. 71,610
8 Claims. (Cl. 123—11)

This invention relates to engines of the expansible chamber type, and more particularly to an internal combustion engine having rotary pistons.

A main object of the invention is to provide a novel and improved internal combustion engine which is relatively simple in construction, which is efficient in operation, and which does not require the use of connecting rods or other linkage elements.

A further object of the invention is to provide an improved internal combustion engine which is relatively inexpensive to manufacture, which is durable in constructions, which is relatively compact in size, and which does not require the use of springs or connecting rods in its operation.

A still further object of the invention is to provide an improved internal combustion engine of the rotary piston type, said engine involving relatively few parts, being economical to operate, and providing a relatively high power capacity in relation to its size and weight.

Further objects and advantages of the invention will become apparent from the following description and claims, and from the accompanying drawings, wherein:

FIGURE 2 is a transverse vertical cross sectional view taken through the engine of FIGURE 1 substantially on the line 2—2 of FIGURE 1.

FIGURE 3 is an enlarged fragmentary cross sectional view taken substantially on the line 3—3 of FIGURE 2.

FIGURE 4 is an enlarged fragmentary cross sectional view taken substantially on the line 4—4 of FIGURE 2.

FIGURE 5a is a diagrammatic view showing the relative positions of the pistons in the annular bore of the engine of FIGURES 1 to 4 at the beginning of a cycle of action of the engine, namely, when fuel is being admitted for a power cycle and the exhaust gases from the previous power cycle are being discharged from the engine.

FIGURE 5b is a diagrammatic view showing a further stage in the cycle, where the admission of fuel approaches termination and the discharge of exhaust gases likewise is nearing completion, with the fuel admission space substantially at maximum volume.

FIGURE 5c is a diagrammatic view showing a still further stage in the cycle wherein the fuel mixture in certain spaces of the engine is under maximum compression and ignition takes place.

FIGURE 5d is a diagrammatic view showing the relationship of the pistons when the ignited fuel develops power which is applied in the form of torque on the output shaft of the engine, with the pistons rotated to a position wherein discharge of the gaseous products of combustion from a previous power stroke begins and intake of fuel for the next cycle likewise begins.

Figure 1:
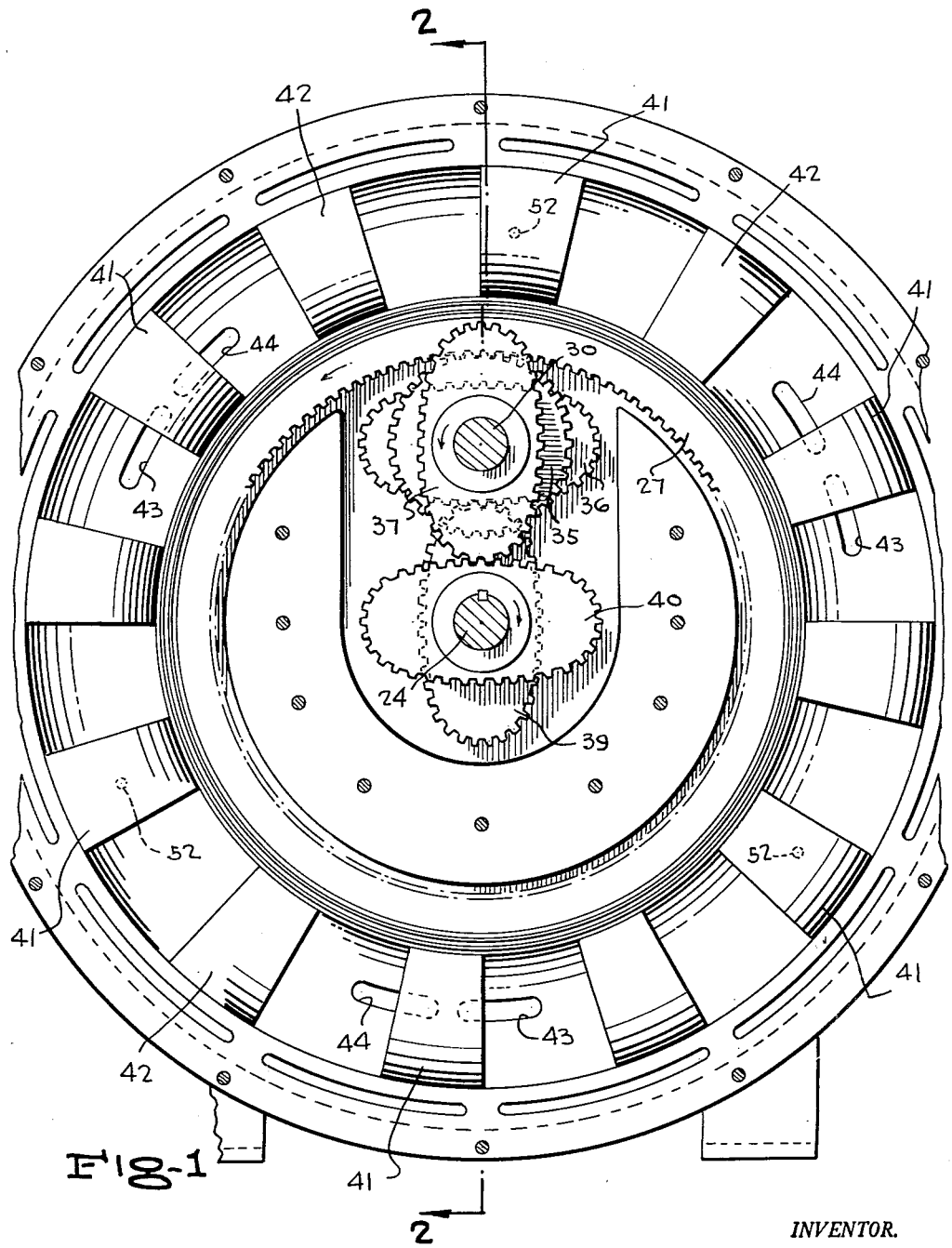
FIGURE 1 is a fragmentary vertical cross sectional view taken through the longitudinal vertical central plane of an improved internal combustion engine constructed in accordance with the present invention, said view being taken substantially on the line 1—1 of FIGURE 2.

Referring to the drawings, the engine is designated generally at 11 and comprises a generally toroidal housing formed of two opposing mating segments 12 and 13 which are provided with substantially vertical wall portions 14 and 15 integral with their outer toroidal segment portions and formed with mating recesses 16 and 17 defining a gear box. The segments 12 and 13 are fastened together by a plurality of transversely extending bolts 18 extending through the intermediate wall portions 14 and 15 and by a plurality of peripheral bolts 19 extending through respective outer flanges 20 and 21 provided on the segments 12 and 13, suitable sealing means being included between the mating surfaces of the segments, such as an annular sealing gasket 22. The segments are provided with suitable supporting legs 23 for mounting the engine on a supporting surface.

Designated at 24 is a main shaft which is journaled in the wall members 14 and 15 on the major axis of the toroidal housing, namely, the central axis extending perpendicular to the vertical longitudinal plane of the engine 11.

The mating segments 12 and 13 are formed with the spaced opposing inwardly facing annular inner surfaces 25 and 26 which define an inwardly facing annular slot located substantially at the central vertical plane of the engine. Designated at 27 and 28 are a pair of side-by-side ring gears arranged in said slot with their gear teeth facing inwardly and suitably sealed with respect to each other and with respect to the walls of the slot, as by sealing rings 29 disposed in annular sealing grooves formed in the opposing surfaces.

Designated at 30 is a supporting shaft which is mounted in the walls 14 and 15 and which extends through the intermediate portion of the cavity defined by the recesses 16 and 17, extending parallel to the main shaft 24. Journaled on the supporting shaft 30 are the respective gear assemblies 31 and 32, the gear assemblies being free to rotate relative to each other and being provided therebetween with a ball bearing assembly 33 to permit free independent rotation of said gear assemblies with respect to each other as well as with respect to the supporting shaft 30. The gear assemblies 31 and 32 comprise identical circular gears 34 and 35 which mesh respectively with the ring gears 27 and 28. The gear assemblies 31 and 32 also comprise generally oval gears 36 and 37 outwardly adjacent the respective circular gears 34 and 35 and arranged with their major axes at right angles in the positions shown in FIGURE 2.

Secured on the main shaft 24 is a gear assembly 38 which comprises a pair of oval gears 39 and 40 with their axes arranged at right angles to each other and meshing respectively with the oval gears 36 and 37, as is clearly shown in FIGURE 2. The arrangement of the oval gears 36, 37, 39 and 40 is such that when the major axis of the oval gear 37 is vertical, the major axis of the oval gear 40 will be horizontal, the major axis of the oval gear 36 will be horizontal and the major axis of the oval gear 39 will be vertical, as shown, for example in FIGURE 5a.

Formed integrally with the ring gear 27 and disposed sealingly and slidably in the toroidal cavity defined between the peripheral portions of the segments 12 and 13 is a first set of evenly spaced piston members 41 and formed integrally with the ring gear 28 is a second set of evenly spaced piston members 42 slidably and sealingly disposed in the toroidal cavity and alternating with the piston members 41. Thus, in the typical embodiment of the engine illustrated in the drawings, there are six evenly spaced piston members 41 and six evenly spaced piston members 42 arranged in alternating relationship in the toroidal cavity defined between the housing segments 12 and 13 and rotating respectively with the ring gears 28 and 27.

In the specific form of the invention disclosed and described herein, three respective pairs of intake and exhaust ports 43 and 44 are provided, evenly spaced around the periphery of the engine housing and circumferentially aligned, as shown in FIGURE 1.

Suitable fuel supply conduits, not shown, are connected to the intake ports 43, and the exhaust ports 44 are connected to a suitable exhaust pipe, not shown.

The housing segments 12 and 13 are provided with cooling jackets 48 and 49 which are supplied with suitable cooling liquid, such as water, by respective conduits 50 and 51 connected to the jacket in the manner illustrated in FIGURE 2.

Suitable ignition means is provided, comprising spark plugs 52, the spark plugs being located in respective recesses communicating with the toroidal cavity defined in the engine housing and located at positions corresponding to the regions of substantially maximum compression of the fuel admitted between adjacent pairs of pistons 42 and 41, as will be presently described. The spark plugs 52 are energized by a suitable ignition system which is conventional per se and forms no part of the present invention.

As shown in the drawings, the spark plugs 52 may be located substantially midway between successive pairs of ports 43, 44, representing positions wherein compression of the fuel will be substantially maximum during the rotary movement of the pistons with the specific gearing system illustrated.

As will be presently explained, the pistons 41 and 42 do not rotate with a constant angular speed but rotate in a pulsating manner for uniform rotary movement of the main shaft 24. This is due to the constantly changing angular speed ratio provided by the coupled oval gears 40, 37 and 39, 36. Thus, the gear arrangement causes the pistons to oscillate with respect to each other as they rotate around the axis of the main shaft 24, whereby the sets of pistons alternately move towards and away from each other as they rotate with the ring gears.

It will be understood that a suitable fly wheel, not shown, may be mounted on the main shaft 24 to stabilize the rotation of said main shaft, so that the main shaft rotates substantially at a constant speed under normal running conditions of the engine.

It will be further understood that the ring gears 27 and 28 oscillate relative to each other because of the action of the meshing oval gears 40, 37 and 36, 39.

It will be noted that for the twelve piston arrangement specifically illustrated in the drawings, there are three sets of intake and exhaust ports 43, 44, spaced 120° from each other around the major axis of the housing of the engine.

FIGURE 5a illustrates a first stage in the cycle of operation of the engine specifically illustrated in FIGURES 1 to 4, for example, wherein fuel is admitted through the ports 43 between the pistons 41 and 42 located forwardly adjacent the fuel admission ports 43, with the pistons traveling counterclockwise, as viewed in FIGURE 5a. At the point of the cycle illustrated in FIGURE 5a, the pistons are substantially evenly spaced with respect to each other. At this point the spaces receiving the fuel are expanding in size, producing suction to assist in drawing the fuel into the engine, and the spaces containing the exhaust gases are decreasing in size, facilitating the expulsion of the exhaust gases through the exhaust ports 44. FIGURE 5b illustrates the next step in the progression of the cycle, showing the intake space between a pair of pistons 41 and 42 as being of increased size as compared with FIGURE 5a, and showing the exhaust space adjacent said pair of pistons, namely, between the intermediate piston 41 and the piston 42 immediately behind same as being substantially decreased in size. FIGURE 5c shows a further stage in the cycle wherein the admission of fuel is substantially completed and likewise, the exhaust action is substantially completed. The pistons 41 and 42 at this point are preparing to reverse their pulsating movement so that fuel will be admitted into the space which immediately before this had contained the exhaust gases. The pistons are likewise preparing to compress the fuel admitted in the previous two stages of the cycle, above described. At this point, compression is substantially completed in the space between the pair of pistons ahead, and the compressed fuel is in a position to be ignited by a spark plug 52. FIGURE 5d diagrammatically illustrates the next stage in the cycle wherein ignition has taken place of the fuel and the relative directions of the pistons with respect to each other reverses, so that the space containing the ignited fuel begins to expand, whereas the space immediately behind containing the fresh fuel begins to contract, preparing same for subsequent ignition. The ignition of the fuel, of course, provides the power stroke, whereby torque is transmitted from the pistons at the forward end of the spaces containing the burning fuel to the main shaft 24, for example, the pistons 41 forwardly adjacent the spark plugs 52 in FIGURE 5d, said torque being transmitted through the ring gear 28, the circular gear 35, the oval gear 37 and the oval gear 40. The reaction on the pistons 42 at the time that the power stroke is being applied to the pistons 41 produces an opposite torque which however when applied to the main shaft 24 is much smaller than the torque developed by the expanding gases on the pistons 41 because the mechanical advantage of the oval gear 37 will be greater than the mechanical advantage of the oval gear 36 at this point, and also because the momentum of the fly wheel and other parts connected to the pistons 42 act against the reactive force.

As will be readily apparent, the gears shown in FIGURE 3 are independent of each other except for the coupling through the shaped gears on the drive shaft. Assuming that there is pressure developed in the power chambers, shown in FIGURE 5a, this pressure will be applied equally to the trailing faces of pistons 42 and the leading faces of pistons 41, with the pistons rotating in a counterclockwise direction, as viewed in FIGURE 5a. The force thus developed will be applied through the ring gears 27, 28 to the circular gears 34, 35, where again the torque will be equal in opposite direction. For purposes of example, let us assume that the major axes of the shaped gears 36, 37, 40, 39 are twice their minor axes. Under these conditions, the gear train 36-39 will have a two-to-one reduction as between gear 34 and shaft 24, and the gear train 37-40 will provide a two-to-one increase. This means that the gear train 36-39 will apply four times the torque to the shaft 24 as the gear train 37-40, causing the shaft to rotate in a clockwise direction, as viewed in FIGURE 5a. The mechanical advantage of the gearing associated with the pistons 42 will decrease as the gears rotate to the positions shown in FIGURE 5c, which is similar to top dead center in an engine of the crank shaft type. As the pistons rotate past the top dead center positions, the pistons 41 will assume the greater leverage with respect to the drive shaft 24. The mechanical advantage of these pistons 41 will then increase until the pistons 41 are in the same positions as pistons 42 in FIGURE 5a. Thus, the engine shaft 24 will continue to rotate in a clockwise direction while the pistons rotate in a counterclockwise direction.

While a specific embodiment of an improved internal combustion engine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In an engine comprising a generally toroidal housing formed with an inwardly facing annular slot, a main shaft journaled on the major axis of said housing, a pair of side-by-side ring gears arranged in said slot with their gear teeth facing inwardly, side-by-side respective identical circular gears meshing with said ring gears and journaled on an axis parallel to said major axis and located between the main shaft and the ring gears, respective oval gears coaxially and rigidly connected to said circular gears, a pair of oval gears mounted on said main shaft and meshing with said first-named oval gears, said last-named oval gears, having their major axes at right angles, respective pistons rigidly connected to the ring gears and slidably mounted in the toroidal housing for rotation with the ring gears, supply conduit means connected to the housing to at times admit combustible fuel between the pistons, means to ignite the fuel, and exhaust gas discharge conduit means located to discharge the products of combustion from between the pistons after the fuel has been ignited to apply a power stroke to the pistons.

2. An engine comprising a generally toroidal housing formed with an inwardly facing annular slot, a main shaft journaled on the major axis of said housing, a pair of side-by-side ring gears arranged in said slot with their gear teeth facing inwardly, side-by-side respective identical circular gears meshing with said ring gears and journaled on an axis parallel to said major axis and located between the main shaft and the ring gears, respective oval gears coaxially and rigidly connected to said circular gears, a pair of oval gears mounted on said main shaft and meshing with said first-named oval gears, said last-named oval gears having their major axes at right angles, respective pistons rigidly connected to the ring gears and slidably mounted in the toroidal housing for rotation with the ring gears, one of said pistons developing torque to drive said main shaft when the fluid expands between the pistons and the gears cooperating to oscillate one ring gear relative to the other ring gear responsive to rotation of said main shaft, whereby the pistons alternately move towards and away from each other as they rotate with the ring gears, supply conduit means connected to the housing and located to admit combustible fuel between the pistons when they are moving towards each other, means to ignite the fuel, and exhaust gas discharge conduit means located to discharge the products of combustion from between the pistons after the fuel has been ignited to apply a power stroke to the pistons and the pistons are moving away from each other.

3. An engine comprising a generally toroidal housing formed with an inwardly facing annular slot, a main shaft journaled on the major axis of said housing, a pair of side-by-side ring gears arranged in said slot with their gear teeth facing inwardly, side-by-side respective identical circular gears meshing with said ring gears and journaled on an axis parallel to said major axis and located between the main shaft and the ring gears, respective oval gears coaxially and rigidly connected to said circular gears, a pair of oval gears mounted on said main shaft and meshing with said first-named oval gears, said last-named oval gears having their major axes at right angles, respective sets of evenly spaced pistons rigidly connected to the ring gears and slidably mounted in the toroidal housing for rotation with the ring gears, the pistons of said sets alternating with each other, the pistons of one set developing torque to drive said main shaft when fluid expands between the pistons of said one set and the adjacent pistons of the other set, whereby the sets of pistons alternately move towards and away from each other as they rotate with the ring gears, supply conduit means connected to the housing and located to admit combustible fuel between the pistons of the respective sets when they are moving towards each other, means to ignite the fuel, and exhaust gas discharge conduit means located to discharge the products of combustion from between the pistons of the respective sets after the fuel has been ignited to apply a power stroke to the pistons.

4. An engine comprising a generally toroidal housing, a main shaft journaled on the major axis of the housing, a pair of side-by-side ring gears arranged coaxially with said housing, respective pistons rigidly connected to the ring gears and slidably mounted in the housing for rotation with the ring gears, a first pair of oval gears on said main shaft with their axes at right angles, a second pair of oval gears rotatably mounted to mesh respectively with the first-named oval gears, means drivingly coupling the second-named oval gears respectively to the ring gears, supply conduit means connected to the housing to at times admit combustible fuel between the pistons, means to ignite the fuel, and exhaust gas discharge conduit means located to discharge the products of combustion from between the pistons after the fuel has been ignited to apply a power stroke to the pistons.

5. An engine comprising a generally toroidal housing, a main shaft journaled on the major axis of the housing, a pair of side-by-side ring gears arranged coaxially with said housing, respective pistons rigidly connected to the ring gears and slidably mounted in the housing for rotation with the ring gears, a first pair of oval gears on said main shaft with their major axes at right angles, a second pair of oval gears rotatably mounted to mesh respectively with the first-named oval gears, means drivingly coupling the second-named oval gears respectively to the ring gears, one of said pistons developing sufficient torque to drive said main shaft when fluid expands between the pistons, and the gears cooperating to oscillate one ring gear relative to the other responsive to rotation of said main shaft, whereby the pistons alternately move toward and away from each other as they rotate with the ring gears, supply conduit means connected to the housing and located to admit combustible fuel between the pistons when they are moving towards each other, means to ignite the fuel, and exhaust gas discharge conduit means located to discharge the products of combustion from between the pistons after the fuel has been ignited to apply a power stroke to the pistons and the pistons are moving away from each other.

6. An engine comprising a generally toroidal housing, a main shaft journaled on the major axis of the housing, a pair of side-by-side ring gears arranged coaxially with said housing, a first pair of oval gears on said main shaft with their major axes at right angles, a second pair of oval gears rotatably mounted to mesh respectively with the first-named oval gears, means drivingly coupling the second-named oval gears respectively to the ring gears, respective sets of evenly spaced pistons rigidly connected to the ring gears and slidably mounted in the toroidal housing for rotation with the ring gears, the pistons of said sets alternating with each other, the pistons of one set developing torque to drive said main shaft when the fluid expands between the pistons of said one set and the adjacent pistons of the other set, whereby the sets of pistons alternately move towards and away from each other as they rotate with the ring gears, supply conduit means connected to the housing and located to admit combustible fuel between the pistons of the respective sets when they are moving towards each other, means to ignite the fuel, and exhaust gas discharge conduit means located to discharge the products of combustion from between the pistons of the respective sets after the fuel has been ignited to apply a power stroke to the pistons and the pistons are moving away from each other.

7. An engine comprising a generally toroidal housing formed with an inwardly facing annular slot, an output shaft, a pair of side-by-side ring gears arranged in said slot with their gear teeth facing inwardly, a first pair of oval gears on said output shaft having their major axes at right angles, a second pair of oval gears journaled to mesh respectively with the first-named oval gears, respective pistons rigidly connected to the ring gears and slidably mounted in the toroidal housing for rotation with the ring gears, means to admit fuel between the pistons and ignite same, whereby to develop a power impulse on the pistons, and means drivingly coupling said ring gears respectively to said second pair of oval gears, whereby to transmit an unbalanced torque component to said output shaft responsive to said power impulse.

8. An engine comprising a generally toroidal housing, an output shaft, a pair of oval gears having their major axes at right angles to each other and drivingly coupled to said output shaft, a pair of pistons slidably mounted in said toroidal housing and rotatable around the major axis of said toroidal housing, means to admit fuel between the pistons and ignite same, whereby to develop a power impulse on the pistons, and means coupling said pistons respectively to said oval gears, whereby to transmit an unbalanced torque component to said output shaft responsive to said power impulse, said last-named means comprising respective side-by-side ring gears secured to the pistons, and respective gear means drivingly coupling said ring gears to the oval gears.

References Cited in the file of this patent

UNITED STATES PATENTS

| | | |
|---|---|---|
| 1,298,838 | Weed | Apr. 1, 1919 |
| 1,944,875 | Bullington | Jan. 30, 1934 |
| 1,973,397 | Stromberg | Sept. 11, 1934 |
| 2,085,505 | Murakami | June 29, 1937 |
| 2,108,385 | Murakami | Feb. 15, 1938 |

FOREIGN PATENTS

| | | |
|---|---|---|
| 556,194 | Great Britain | Sept. 23, 1943 |